(12) United States Patent
Smith et al.

(10) Patent No.: US 7,193,233 B2
(45) Date of Patent: Mar. 20, 2007

(54) VARIABLE AREA FLOW RATE METER USING OPTICAL SENSING OF FLOAT POSITION IN THE DUCT

(75) Inventors: Daniel J. Smith, Lakeville, MN (US); Quentin Smisek, Minneapolis, MN (US); Haresh Lakhan, Eagan, MN (US)

(73) Assignee: The Futurestar Corporation, Bloomington, MN (US)

( * ) Notice: Subject to any disclaimer, the term of this patent is extended or adjusted under 35 U.S.C. 154(b) by 128 days.

(21) Appl. No.: 11/125,500

(22) Filed: May 10, 2005

(65) Prior Publication Data

US 2005/0263729 A1    Dec. 1, 2005

Related U.S. Application Data

(60) Provisional application No. 60/569,666, filed on May 10, 2004.

(51) Int. Cl.
*G01N 15/06* (2006.01)

(52) U.S. Cl. .................. 250/573; 250/574; 73/305; 340/606

(58) Field of Classification Search .......... 250/221, 250/573, 574, 577; 73/1.33, 293, 305, 861.42, 73/861.52, 861.61, 861.62; 340/606
See application file for complete search history.

(56) References Cited

U.S. PATENT DOCUMENTS

| 4,732,035 | A | * | 3/1988 | Lagergren et al. | .......... 73/49.2 |
|---|---|---|---|---|---|
| 4,735,097 | A | | 4/1988 | Lynnworth | .............. 73/861.28 |
| 4,873,989 | A | | 10/1989 | Einzig | ........................ 128/692 |
| 4,947,036 | A | | 8/1990 | Pokorski et al. | ......... 250/226.1 |
| 5,004,913 | A | | 4/1991 | Kleinerman | ........... 250/227.21 |
| 5,178,153 | A | | 1/1993 | Einzig | ........................ 128/692 |
| 5,257,090 | A | * | 10/1993 | Meinzer et al. | ............. 356/498 |
| 5,291,031 | A | * | 3/1994 | MacDonald et al. | ........ 250/577 |
| 6,259,516 | B1 | | 7/2001 | Carter et al. | ............... 356/37.6 |
| 6,628,202 | B2 | | 9/2003 | McQueen et al. | .......... 340/603 |

* cited by examiner

*Primary Examiner*—Stephone B. Allen
(74) *Attorney, Agent, or Firm*—Nawrocki, Rooney & Sivertson, P.A.

(57) ABSTRACT

A flowmeter has a variable area, vertically-oriented duct through which flows fluid whose flow rate is to be determined. A float in the duct assumes a position in the duct that depends on the flow rate of fluid in the duct. A window is located at an end of the duct in alignment with a longitudinal axis of the duct. A transducer unit projects a light beam through the window and along the axis toward the float. The transducer includes a light sensor that detects light returned by the float by reflection or some other mechanism to the transducer unit. The intensity or other characteristic of the returned light indicates the position of the float in the duct, from which the fluid flow rate may be determined.

10 Claims, 4 Drawing Sheets

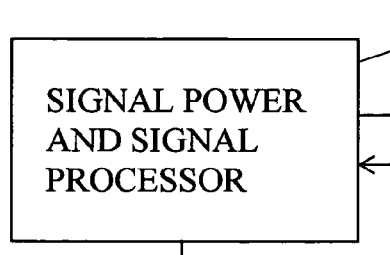
Fig. 1
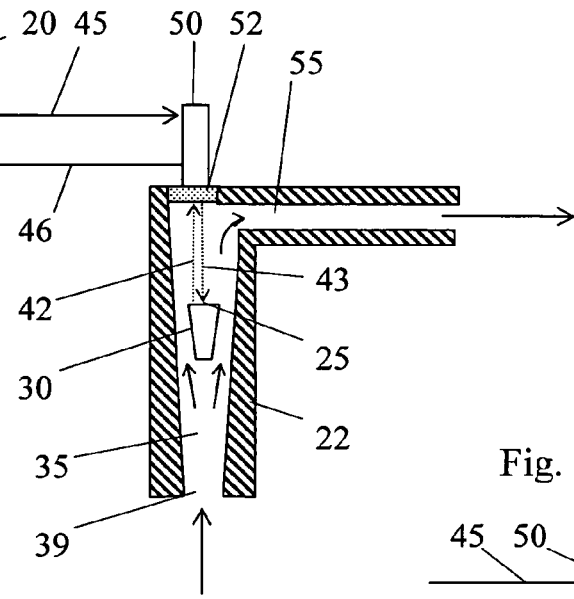
Fig. 2
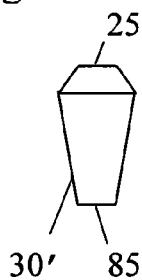
Fig. 4
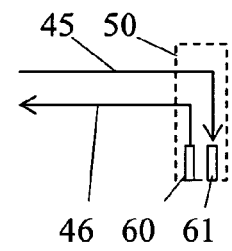
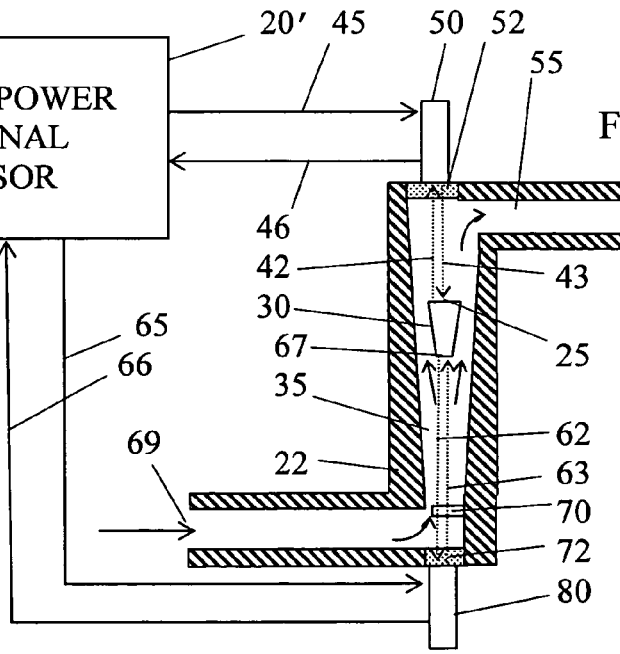
Fig. 3

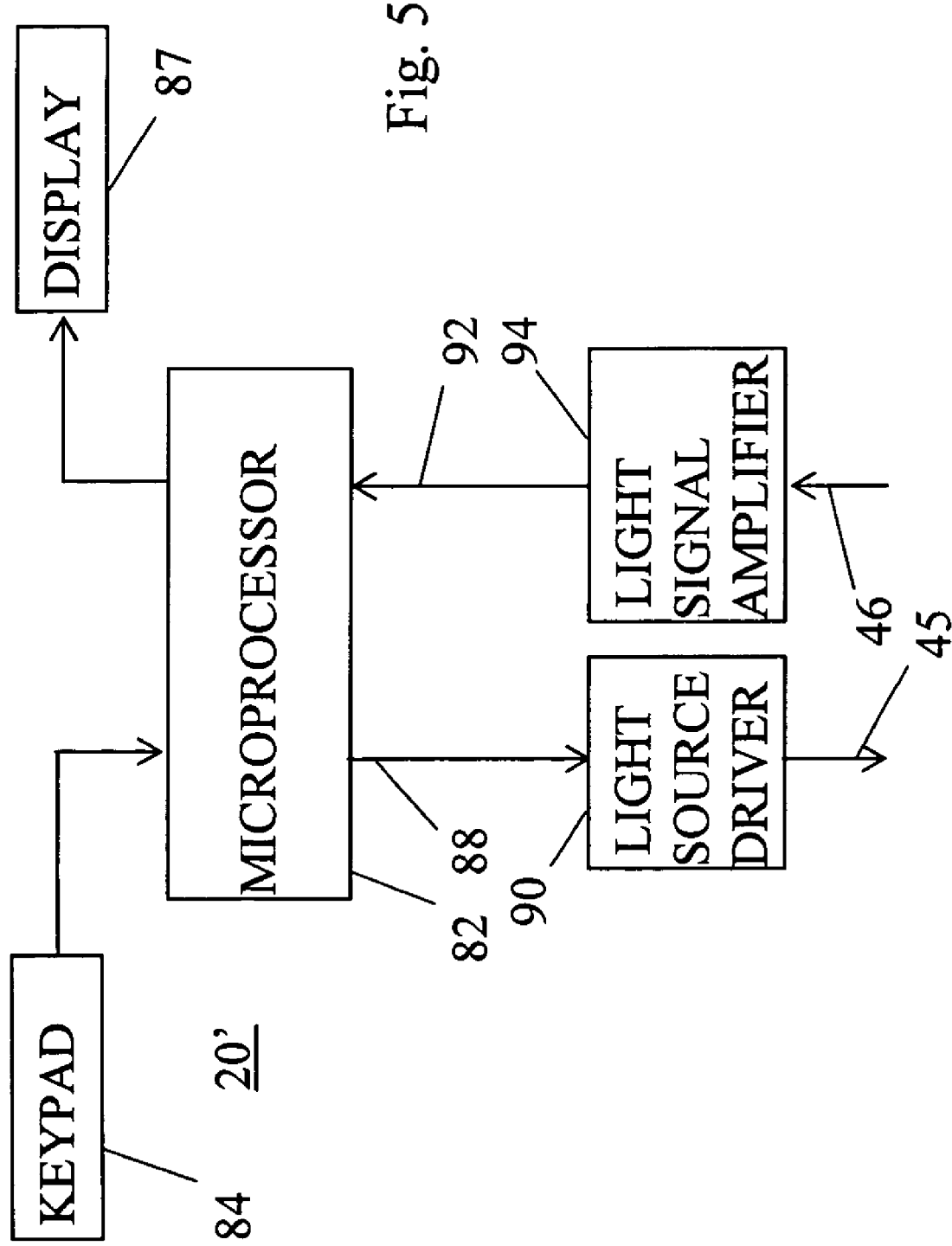

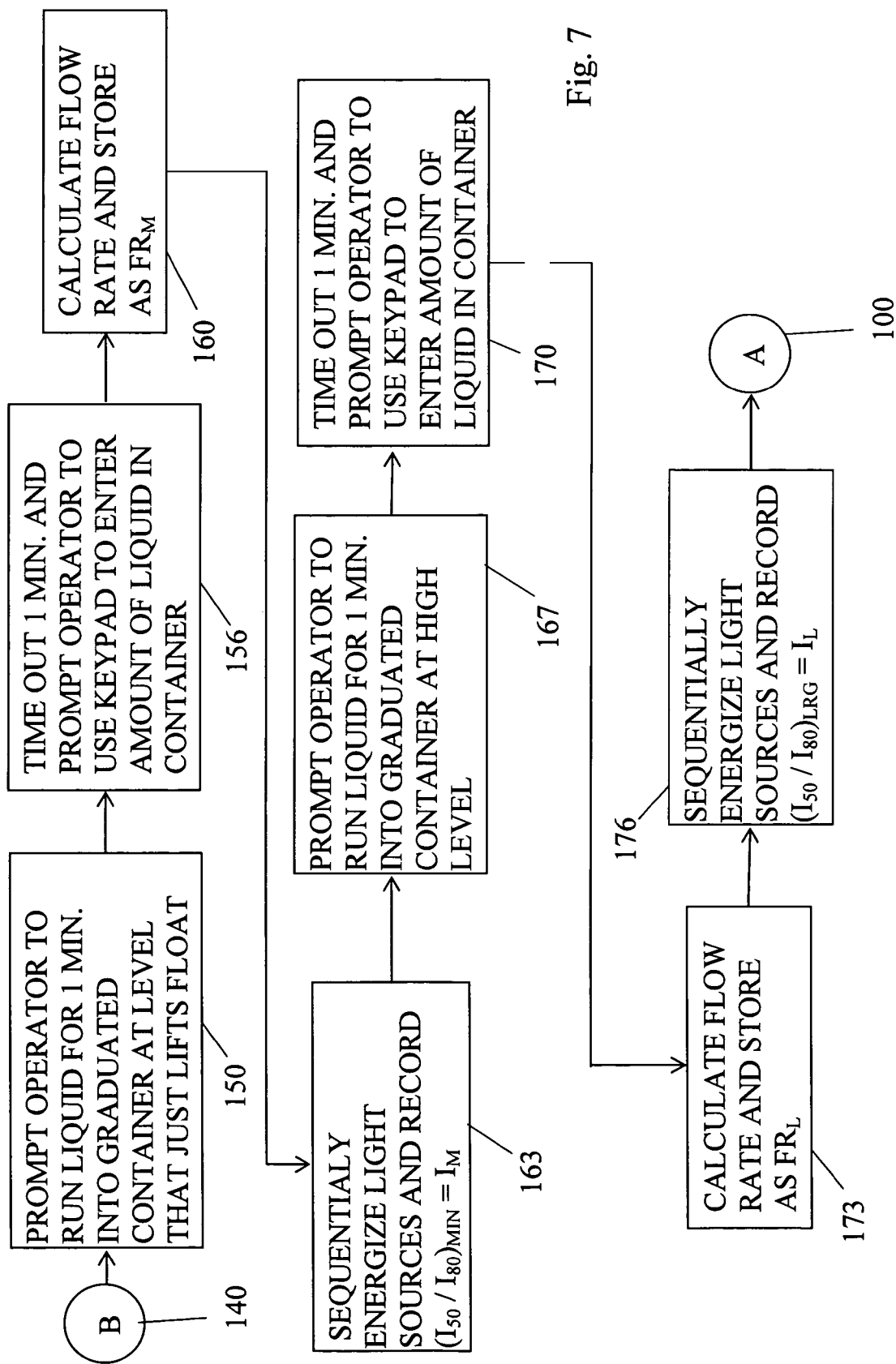

VARIABLE AREA FLOW RATE METER USING OPTICAL SENSING OF FLOAT POSITION IN THE DUCT

CROSS-REFERENCE TO RELATED APPLICATIONS

This is a regular application filed under 35 U.S.C. § 111(a) claiming priority, under 35 U.S.C. § 119(e)(1), of provisional application Ser. No. 60/569,666, previously filed May 10, 2004 under 35 U.S.C. § 111(b).

BACKGROUND

A variable area volumetric flow rate meter, hereafter simply VA flowmeter, uses a vertical sensing duct through which flows a fluid whose volumetric flow rate is to be measured. The sensing duct has a cross section area that smoothly increases along the length of the sensing bore, typically increasing upwards but that may also increase downwards. Typically, the fluid flows into an end of the duct having the smaller cross section area, and out of the duct at the larger cross section area although variations on this design are possible.

In any duct of changing cross section area, velocity at each point along the duct, of a fluid flowing in the duct varies inversely to the area at that point. While the situation is somewhat different for flow of a compressible gas in such a duct, for low flow velocities generally the velocity will also decrease as duct area increases.

The sensing duct for such a flowmeter contains a float occupying a fraction of the duct area. Normally, the specific gravity of the float is somewhat higher than the fluid flowing in the duct, so the term "float" is a bit misleading. When dealing with liquids however, it is actually possible to use a float that does float.

Fluid flowing through the duct and past the float creates drag force on the float that lifts it from the bottom of the duct. The drag force depends on the fluid velocity around the float, increasing with increasing flow velocity of course.

The float will rise or fall to a point where the drag created by the velocity of the adjacent fluid flowing past the float exactly equals the gravitational force provided by the float less the buoyant force on the float applied by the fluid in the duct. Regardless of the volumetric flow rate in the duct, the float will always reach the point in the duct where the velocity of the adjacent fluid exactly balances the net of float weight less buoyant force on the float. The product of the area of the duct where the float finds equilibrium and the velocity of the fluid adjacent to the float equals the volumetric flow rate of fluid through the duct.

If the fluid is a gas, buoyancy force is very small, indeed may even be ignored, and the gravitational force predominates. If the fluid is a liquid, the buoyancy force may be significant. In an upwardly diverging duct through which a liquid flows, relative specific gravities of the liquid and the float are important in determining the float position for a given flow rate. A downwardly diverging duct with a float whose specific gravity is less than the liquid in the duct is most useful for measuring small liquid flow rates because buoyancy and gravity forces oppose creating a relatively small net force. Normally, the float specific gravity will be larger than that of the fluid, perhaps substantially larger in the case where the fluid is a gas.

Where fluid flow is measured in an upwardly diverging duct, the float specific gravity is normally greater than that of the fluid. The fluid itself; the specific gravity, shape, size, and total weight of the float; and the duct geometry should all be chosen so that the available range of the float's vertical position in the duct allows the expected range of flow rates to be measured.

The flow rate can be calibrated against the float position to accurately indicate the flow rate. In the simplest situation, an operator provides several different known fluid flow rates to the flowmeter and records the position of the float for each flow rate. This provides a table in which the operator can interpolate to determine the flow rate with good accuracy.

Some applications for these flowmeters require them to handle corrosive fluids without contaminating the fluid flowing through the flowmeters. For most of these types of fluids, materials exist that are inert with respect to the fluid. All of the flowmeter surfaces in contact with the fluid must comprise such inert material to avoid contaminating the fluid.

Determining the float position in the sensing duct is sometimes difficult. Magnetic position sensing requires magnetic material in the float. Corrosive fluids may attack such magnetic materials. Even if the magnetic material is completely embedded in the float, users are concerned that the corrosive fluid may penetrate the float and cause contamination.

Alternatively, an optical or other sensor may be located along the length of the sensing duct, but such a sensor must be quite large and complex. Such sensing requires the sensing duct to be made of transparent material, or at least have a transparent window along the sensing duct length, which complicates the sensing duct structure.

BRIEF DESCRIPTION OF THE INVENTION

A flowmeter for providing a signal indicating fluid flow rate through the flowmeter has a vertical, tapered duct defined by a duct wall. An axis extends the length of the duct along the fluid flow. A first opening in the duct receives flow of fluid whose flow rate is to be measured. Fluid exits the duct through a second opening. A float within the duct shifts position along the duct axis. The float's vertical position in the duct indicates the fluid flow rate.

The flowmeter further comprises a window forming a portion of the duct wall in alignment with the duct axis. The window is transparent to light and positioned adjacent to one opening of the duct. A light source external to the duct and adjacent to the window transmits light through the window toward the float.

The float has a feature that returns a portion of the light shining on the float through the window. The feature may be a reflective surface on the float, or may be a property of the float material that causes the light to diffuse within the float and return to the window.

A light sensor is located external to the duct and receives through the window, light returned from the float previously transmitted toward the float by the light source. The light sensor provides a sensor signal indicating the level of light received by the light sensor.

A controller receives the sensor signal and computes the position of the float therefrom. By calibrating the fluid flow in the duct with the float position, the controller can provide a signal indicating the rate of fluid flow in the duct.

BRIEF DESCRIPTION OF THE DRAWINGS

FIG. 1 shows a simplified version of the invention.

FIG. 2 is a block diagram of a transducer for measuring position of a float in a VA flowmeter.

FIG. 3 is a two-transducer version of the invention.

FIG. 4 is a detail of one design of a float used by the invention.

FIG. 5 is a block diagram of a controller suitable for operating the flowmeter.

FIG. 7 is a flow chart of firmware for assisting in determining parameters for calculating the current value of the flow rate.

DESCRIPTION OF THE PREFERRED EMBODIMENTS

Figure 6:
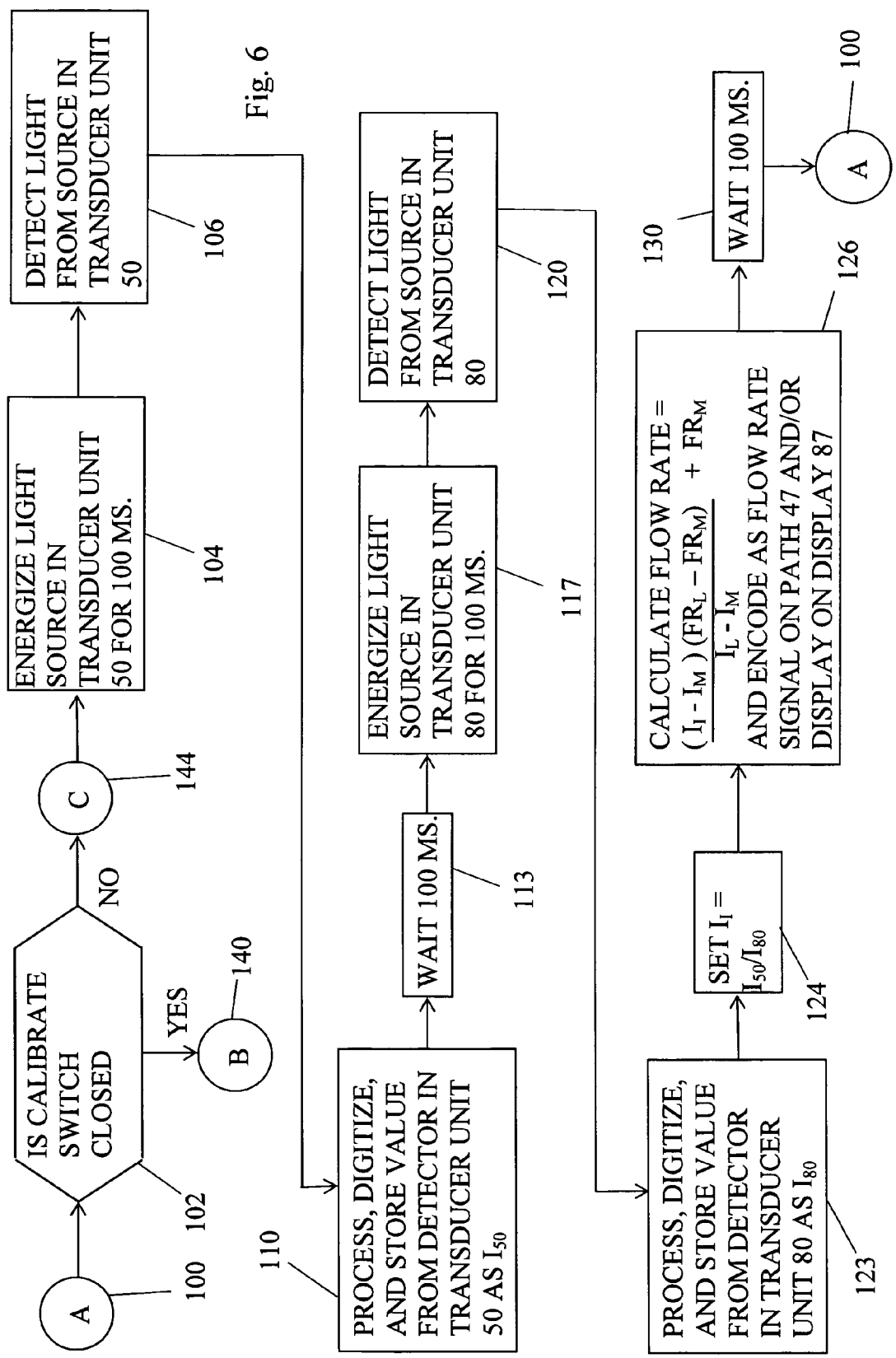
FIG. 6 is a flow chart of firmware for calculating the current value of the flow rate.

FIG. 1 shows in section a simplified variable area flowmeter 10 incorporating one version of the invention. Flowmeter 10 has a duct 35 defined by a wall 22. Duct 35 has an inlet port 39 where fluid flow enters duct 35 and an outlet port 55 where fluid exits duct 35. Duct 35 diverges upwards, so that the cross section area of duct adjacent to outlet port 55 is substantially larger than the cross section area adjacent to inlet port 39. Duct 35 has a longitudinal axis extending along the duct in the direction of fluid flow.

A float 30 is present within duct 35. The term "float" in this context is a bit misleading, since float 30 will normally, for reasons already explained, have a specific gravity substantially greater than the fluid flowing in duct 35, and thus does not float at the top of duct 35. The frustro-conical shape shown for float 30 in FIG. 1 is suitable for a variety of flowmeter designs. The dimensions of float 30 should be sufficiently large relative to the duct 35 diameters to maintain the float 30 axis substantially in alignment with the axis of duct 35.

The VA flowmeter 10 shown in FIG. 1 uses a transducer unit 50 to detect the position of float 30 within duct 35. Unit 50 is shown in more detail in FIG. 2 as including a light source 61 and a light detector 60. Light source 61 receives operating power from a control unit 20 on a path 45. Light source 61 is preferably an LED that may provide either a visible, an IR, or a UV beam 43 directed more or less parallel to the axis of duct 35 and toward float 30. Light detector 60 provides a signal on path 46 indicating the intensity of a light beam 42 returned from. Light detector 60 is preferably a photodiode.

A window 52 that is transparent to light provided by light source 61 is placed at one end of duct 35 in alignment with the duct 35 axis. In FIG. 1, window 52 is placed near outlet port 55, but may be also advantageously placed near inlet port 39. Transducer 50 is mounted on the outside surface of window 52 so that light from light source 61 passes through window 52 and the fluid within duct 35, and strikes float 30.

In some arrangements, light sensor 60 may be at one end of duct 35 and light source 61 may be at the other end. In such an arrangement, a window should be provided for each of the light source 61 and the light sensor 60.

Light from source 61 reflects from or otherwise returns from float 30 through the fluid within duct 35 to detector 60 as symbolized by arrow 42. The intensity of the returning light increases with decreasing distance between the top of float 30 and transducer unit 50, often in a somewhat linear way.

Controller 20 periodically provides power on path 45 to activate light source 61. The light returning to detector 60 from float 30 causes detector 60 to provide a signal on path 46. The signal on path 46 indicates the light intensity at detector 60, and is usually quite constant for a given float position. That is, the signal on path 46 for a given light level and float position typically does not change significantly over time.

Therefore, the signal on path 46 can be empirically correlated with the flow rate. However, the signal may need to be processed and digitized before use. The position of the float in the sensing tube provides information in the returned light from which the float position can be derived. The float position and the intensity of the returned light may be correlated during a calibration process. The intensity of the returned light may then be used to indicate float position, which indicates the flow rate. Controller 20 provides the flow rate in a flow rate signal carried on path 47. The flow rate signal can be used to provide a visible indication of the flow rate, or in a closed loop system for process control, for example.

Flowmeter 10 is particularly well-suited for use with corrosive fluids. No metallic materials need be placed in contact with the fluid flowing in duct 35. Every component in the system may be non-reactive for the particular fluid involved. No complicated float position sensing along the length of duct 35 is necessary. The walls 22 need not even be transparent.

Light source 61 may comprise a laser diode light source projecting a collimated, coherent beam through the transparent window axially along the sensing duct. Using a high-intensity multi-wavelength light source is another option but may have less good results. A reflective top 25 on the float 30 may reflect a portion of the beam from the light source 61 back through the window 52 to detector 60.

Another option that may be useful is to form float 30 from a transparent or translucent material. Such a type of material allows an amount of light to return to the photodiode through diffusion and backscatter rather than through reflection. Teflon (Reg. trademark of Dupont Corp.), PFA, PTFE, FEP, and TPM, and non-Teflon CTFE are some of the materials that seem to have the proper amounts of translucency and that are also inert with respect to a wide range of corrosive materials. The sensing duct may have a reflective outer surface to increase the intensity of the returned light.

In one version of the invention the float top surface 25 is slightly convex, producing a diverging reflected beam 42, although other float top shapes may be suitable as well. A diverging beam allows the beam reflection to reliably impinge on detector 60 regardless of the angular orientation of the float. A radius of curvature of the reflective float top on the order of 2.5 cm. may be suitable. In any case, the float top surface preferably has a uniform finish so that rotation of the float will not in itself affect the intensity of the returned light. Convex, concave, flat, and grooved float surfaces may also provide returned light that accurately indicates float position.

Suitable values for beam wavelength, intensity, and size depend on the characteristics of the fluid. For example, when measuring the flow of fluids such as corrosive aqueous liquids and organic solvents, a beam with a wavelength of 850 nm., an intensity of 1.25 mw., and a cross section diameter of 4.6 mm. is suitable.

The distance the beam travels through the fluid also reduces beam intensity. In actual practice, both float distance-based attenuation and fluid attenuation may cooperate to attenuate the beam in a way that allows accurate float position sensing.

Float position sensing can also use a piezoelectric element that generates sound pulses reflected back to a microphone or sound sensor from the float||. Information in the reflected sound depends on the float position in the sensing tube as well as the characteristics of the fluid. Since sound travels much more slowly than does light, time delays may be much easier to measure and result in more accurate float position sensing. The window through which the sound beam passes must then be of the type that is transparent to that sound, or at least does not attenuate the sound substantially.

FIG. 3 shows a further version of a flowmeter 10' that is in many ways similar to flowmeter 10 shown in FIG. 1. Similar elements have similar or identical reference numbers.

Inlet port 69 provides fluid to duct 35. A second window 72 is positioned at the small end of duct 35. A transducer unit 80 whose design is essentially identical to that of transducer unit 50 has a light source positioned to project light toward the bottom end of float 30 as indicated by beam 63. Light returns from float 30 as beam 62 indicates and is detected by a detector in transducer unit 80.

A finger or arm 70 supports float 30 during times of little or no fluid flow through duct 35. Finger 70 may be very narrow to thereby avoid interfering either with fluid flow or with light beams 62 and 63.

Controller 20' provides power for operating the light source within transducer unit 80 on path 65. A signal carried on path 66 indicates the light level detected by the detector internal to transducer unit 80.

Controller 20' operates in a mode somewhat different from that of controller 20 because of extra information provided by the second transducer 80. FIG. 5 shows the configuration of a simple controller 20'. A microprocessor 80 is designed to execute software or firmware that implements the functions described in FIGS. 6 and 7, flow charts that describe firmware for operating flowmeter 10'.

A keypad 84 allows operator input to microprocessor 82. Keypad 84 has keys 0–9 for number entry and has a calibrate key and an enter key.

A display 87 provides numeric information for an operator. Computations by microprocessor 82 may generate the numbers displayed on display 87. Microprocessor 82 may also cause display 87 to show keypad 84 entries.

Microprocessor 82 provides a signal on path 88 causing a light source driver 90 to provide power on path 45 for illuminating light source 60. A light signal amplifier 94 amplifies the light sensor signal on path 46 and sends the amplified signal to microprocessor 82 on path 92.

The firmware defined by FIGS. 6 and 7 discloses one way that a microprocessor can control operation of flowmeter 10'. The implementation of FIGS. 6 and 7 is for use with a duct 35 whose cross section area increases linearly upwards with distance from finger 70. The calculations in FIG. 6 assume that the intensity of beams 42 and 62 varies linearly with the distance of float 50 from finger 70, which is reasonable. The fluid flowing in duct 35 should be a liquid. One should realize that many other computer-controlled operating modes may be used as well.

FIG. 6 is a continuously running operating loop for controlling flowmeter 10'. FIG. 7 shows firmware that controls and simplifies calibration of flowmeter 10'.

In FIG. 6, connector symbol A 100 indicates the beginning and end of the loop. If the calibrate key is operated, decision element transfers instruction execution to connector element B 140 in FIG. 7.

If calibration is not commanded, then activity element 104 causes light source 60 to illuminate float 30 for 100 ms. Since float 30 may not be totally stable in its position in duct 35, this provides an opportunity for microprocessor 82 to average the position of float 30. Activity element 106 samples the light intensity from float 30, typically several times. Activity element 110 processes the signals from light sensor 60. This may include multiple sensing instances to measure the average float 30 position accurately. The intensity value for light returned from float 30 is recorded as $I_{50}$.

Activity element 113 delays further processing for 100 ms., in case the light source driver provides the timer function for operating light source 61. Activity elements 117, 120, and 123 perform a similar function for transducer unit 80. The intensity of the light returned to the light sensor in transducer 80 is recorded as $I_{80}$. Activity element 124 then calculates the ratio of the two intensities as $I_f = I_{50}/I_{80}$.

To determine flow rate, computational element 126 calculates the formula shown. The formula in computational element 126 is an interpolation based on parameters determined by a calibration shown in FIG. 7. The interpolation depends for accuracy on the requirement that duct area increases linearly with distance upwards from finger 70, and on the accuracy of the assumption that the intensity of light in beams 42 and 62 varies linearly with distance of float 30 from transducer units 50 and 80.

The flow rate value is provided either in a signal on path 47 or on display 87. After calculating flow rate and providing the flow rate value for use, microprocessor 82 delays further execution for 100 ms. as shown by activity element 130, and then reexecutes the loop of FIG. 6.

FIG. 7 discloses how the firmware executed by microprocessor 82 cooperates with an operator to calibrate the system. When calibration is requested by the operator pressing the calibrate key on keypad 84, activity element 150 causes the display unit 87 to prompt the operator to adjust flow rate through flowmeter 10' at a rate that just barely lifts float 30 from finger 70. Further instructions of activity element 150 indicate on display 87 the start of a 1 min. interval during which the operator holds a graduated container to receive liquid flowing from the outlet port 55.

Conveniently, microprocessor 82 can time that interval with the instructions of activity element 156. When the 1 min. interval has expired, the instructions cause display unit 87 to indicate that the operator should stop the flow or remove the container and then use keypad 84 to enter into microprocessor 82 the quantity of fluid held in the container. The instructions of activity element 160 cause microprocessor 82 to convert the amount of liquid in the container to the measured minimum flow rate and record same as $FR_M$. In one version the container may be graduated in flow rates based on a one minute interval rather than a volume, in which case microprocessor 82 can enter $FR_M$ directly.

The instructions of activity element 163 then sequentially activate the light sources in transducer units 50 and 80. Units 50 and 80 should be sequentially activated to avoid interference of one light beam 42 or 62 by the other. The light intensities sensed by transducer units 50 and 80 are recorded respectively as $I_{50}$ and $I_{80}$. Activity element 163 then calculates and records as $I_M$ the ratio $(I_{50}/I_{80})_{MIN}$ for these values of $I_{50}$ and $I_{80}$.

Activity element 167 then prompts the operator to increase the fluid flow rate to somewhere near the level that shifts the position of float 30 to close to the top of duct 35, and for the operator to again run liquid into the container for 1 min.

Activity element 170 then prompts the operator to use keypad 84 to enter the amount of liquid in the container. The instructions of activity element 173 cause microprocessor 82 to convert the volume of liquid in the container to a near-maximum flow rate and record same as $FR_L$.

The instructions of activity element 176 then sequentially activate the light sources in transducer units 50 and 80. The light intensities sensed by transducer units 50 and 80 are recorded respectively as $I_{50}$ and $I_{80}$. Activity element 163 then calculates and records as $I_L$ the ratio $(I_{50}/I_{80})_{LRG}$ for these values of $I_{50}$ and $I_{80}$.

Instruction execution then returns to connector A 100 to calculate flow rates. The formula in calculation element 126 uses the parameters calculated by the firmware of FIG. 7 and the activities of the operator described in FIG. 7 to perform an interpolation between the two flow rates used by the firmware of FIG. 7. The accuracy of the calculation relies on linearities in the system. These are first, the linearly increasing area of duct 35, and second, the linear change in the intensity of light beams 42 and 62 sensed at transducer units 50 and 80 with changes in the distance between float 30 and the transducer units 50 and 80.

The invention claimed is:

1. A flowmeter for providing a signal indicating fluid flow rate through the flowmeter, said flowmeter of the type having a vertical, tapered duct defined by a duct wall and having an axis extending the length of the duct, a first opening for receiving flow of fluid whose flow rate is to be measured, and a second opening from which the fluid exits the duct, and a float shifting position along the duct axis within the duct and whose vertical position in the duct indicates the fluid flow rate, said flowmeter further comprising:
 a) a window forming a portion of the duct wall in alignment with the duct axis, said window transparent to light and positioned adjacent to one opening of the duct;
 b) a light source external to the duct and adjacent to the window, and transmitting light through the window toward the float;
 c) a feature of the float that returns to the window a portion of the light shining on the float; and
 e) a light sensor external to the duct and receiving through the window, light returned from the float previously transmitted toward the float, and providing a sensor signal indicating the level of light received by the light sensor.

2. The flowmeter of claim 1, wherein the light sensor is a photodiode.

3. The flowmeter of claim 1, including a circuit receiving the sensor signal and processing the signal.

4. The flowmeter of claim 1, wherein the duct includes a window transparent to light adjacent to each duct opening, a pair of light sources external to the duct, each adjacent to to one window and each transmitting light through the adjacent window toward the float, and a pair of light sensors external to the duct each adjacent to a window, and receiving through the adjacent window, light returned from the float previously transmitted toward the float, and providing a sensor signal indicating the level of light received by the light sensor.

5. The flowmeter of claim 4, wherein the float comprises material that returns by reflection, light striking the float.

6. The flowmeter of claim 4, wherein the float comprises material that returns by diffusion, light striking the float.

7. The flowmeter of claim 1, wherein the float comprises material that returns by reflection, light striking the float.

8. The flowmeter of claim 1, wherein the float comprises material that returns by diffusion, light striking the float.

9. The flowmeter of claim 4 wherein the cross section area of the duct varies linearly along the duct axis.

10. The flowmeter of claim 9, including a controller receiving sensor signals from the light sensors for two different fluid flow rates, computing the ratio of the sensor signals for each flow rate, and determining therefrom a third fluid flow rate.

* * * * *